(12) United States Patent
Immel (10) Patent No.: US 12,226,722 B2
(45) Date of Patent: Feb. 18, 2025

(54) FLUID FILTER ANTI-PREFILL DEVICE

(71) Applicant: CATERPILLAR INC., Peoria, IL (US)

(72) Inventor: Jon Tyler Immel, Chillicothe, IL (US)

(73) Assignee: CATERPILLAR INC., Peoria, IL (US)

( * ) Notice: Subject to any disclaimer, the term of this patent is extended or adjusted under 35 U.S.C. 154(b) by 467 days.

(21) Appl. No.: 17/738,412

(22) Filed: May 6, 2022

(65) Prior Publication Data

US 2023/0356122 A1 Nov. 9, 2023

(51) Int. Cl.
*B01D 35/153* (2006.01)
*B01D 29/13* (2006.01)

(52) U.S. Cl.
CPC .......... *B01D 35/153* (2013.01); *B01D 29/13* (2013.01); *B01D 2201/0446* (2013.01); *B01D 2201/291* (2013.01); *B01D 2201/302* (2013.01); *B01D 2201/4092* (2013.01)

(58) Field of Classification Search
CPC ................ B01D 35/153; B01D 29/13; B01D 2201/0446; B01D 2201/291; B01D 2201/302; B01D 2201/4092; B01D 29/21
USPC .... 210/234, 450, 493.2, 440–444, 437, 457, 210/320
See application file for complete search history.

(56) References Cited

U.S. PATENT DOCUMENTS

| | | | |
|---|---|---|---|
| 6,481,580 B1 | 11/2002 | Amstutz et al. | |
| 6,554,140 B2 | 4/2003 | Steger, Jr. et al. | |
| 6,571,962 B2 | 6/2003 | Thomas | |
| 6,814,243 B2 | 11/2004 | Amstutz et al. | |
| 9,089,795 B2 | 7/2015 | Salvador et al. | |
| 9,789,426 B2 | 10/2017 | Morris et al. | |
| 9,884,279 B2 | 2/2018 | Beard et al. | |
| 10,914,278 B2 | 2/2021 | Morris et al. | |
| 2009/0127198 A1 | 5/2009 | Salvador et al. | |
| 2013/0206678 A1* | 8/2013 | Ries ........................ | B01D 29/15 210/435 |
| 2016/0082370 A1 | 3/2016 | Morris et al. | |
| 2018/0161708 A1 | 6/2018 | Morris et al. | |
| 2020/0086253 A1 | 3/2020 | Seamons | |

* cited by examiner

*Primary Examiner* — Madeline Gonzalez (57) ABSTRACT

An anti-prefill device may be disposed at a radially central portion of an endcap mounted on one axial end of an annular filter medium in a filter system. The anti-prefill device includes a first, annular, fluid receiving portion including an externally threaded engagement surface configured to be threadingly engaged with a central, internally threaded boss of a filter base of the filter system at the axial end of the annular filter medium, the first, annular, fluid receiving portion defining an annular concave recess open upwards toward the filter base of the filter system, and a second, annular, fluid blocking portion configured as a cylindrical cap overlapping a radially central tubular portion of the first, annular, fluid receiving portion that projects upwards toward the filter base from a radially inner extent of the radially central portion of the endcap, the second, annular fluid blocking portion being oriented with a concave recess of the cylindrical cap open downwards toward the first, annular, fluid receiving portion.

20 Claims, 7 Drawing Sheets

FLUID FILTER ANTI-PREFILL DEVICE

TECHNICAL FIELD

The present disclosure relates to fluid filters and, more particularly, to a fluid filter anti-prefill device that prevents unfiltered fluid from being introduced into filtered liquid on a downstream side of an annular filter medium.

BACKGROUND

Cartridge style fluid filters, such as, for example, fuel or lubricant filters associated with an engine, typically include a replaceable filter element contained within a canister that is threadingly engaged to the engine. Unfiltered fluid, e.g., fuel or lubricant, is received by the filter via an inlet port, particulates are removed from the unfiltered fluid via the filter element, and filtered fluid is delivered to the engine via an outlet port. The filter element often includes a generally cylindrical filter medium, e.g., fabric or other porous material, supported within the canister via one or more endcaps, such that unfiltered fluid flows through the filter medium in a generally radial direction. An endcap typically supports and/or positions the filter medium within the canister and with respect to the inlet and outlet ports. Fluid filters usually also include one or more seals that sealingly separate the inlet and outlet ports to reduce or eliminate unfiltered fluid from bypassing the filter medium.

Typically, the filter elements of such fluid filters are frequently replaced to reduce pressure drop across the filter medium, avoid deterioration of the seals, and/or otherwise attempt to ensure the fluid filter operates as desired. To replace a filter element, the canister is usually unthreaded from the engine, the seals between the inlet and outlet flows are unseated, the old filter element is removed from the canister, a new filter element is inserted, and the canister is rethreaded on the engine. An operator replacing a filter cartridge might prime the canister with fluid to avoid and/or reduce entrapped air within the fluid system. This priming fluid is often previously used and/or unfiltered fluid and priming the canister may require great care to avoid priming fluid from being placed on the downstream side, i.e., the filtered fluid side, of the filter medium. Additionally, proper reseating of the seals, either the old seals or new seals, during filter cartridge replacement is desirable to provide sufficient sealing between the inlet and outlet ports and, thus, to reduce unfiltered fluid from bypassing the filter medium. Unfiltered and/or priming fluid downstream of the filter medium, either from insufficient sealing and/or from operator priming, may result in damage to one or more engine components during operation.

U.S. Pat. No. 6,554,140 ("the '140 patent") issued to Steger, Jr. et al. discloses a filter assembly including an outer seal that forms a seal between an outer shell and a filter base and an inner seal that forms a seal between an endcap and the filter base. The filter assembly is threadingly attached to the filter base via a nut-plate that compresses the outer seal against the filter base. The filter assembly also includes a filter element wherein unfiltered fluid flows from an unfiltered fluid passageway to a radial space between the outer shell and the filter element, unfiltered fluid flows through the filter element into an inner passageway, and the resulting filtered fluid flows into a filtered fluid passageway.

The '140 patent may provide a seal between the filter assembly and the filter base with the outer seal and may provide a seal to minimize fluid leakage at a connection between the filtered fluid passageway and the inner passage with the inner seal. The '140 patent may, however, require numerous components to achieve these seals, complicating the assembly and alignment that may require precise manufacturing tolerances thereof and/or potential reduce the sufficiency of the seal. Additionally, the filter assembly of the '140 patent does not include any means for preventing a user from intentionally or accidentally introducing unfiltered fluid to the downstream side of filter medium of the filter assembly when priming the system to reduce air entrapment.

The present disclosure is directed to overcoming one or more of the shortcomings set forth above.

SUMMARY

In one aspect, the present disclosure is directed to an endcap with a central, radial disk portion configured to be mounted and molded to one axial end of an annular filter medium positioned around a center tube of a filter element in a filter system, the central, radial disk portion including a radially outer circumferential lip extending in a first direction toward the center tube and annular filter medium to overlap and engage with an outer periphery of the annular filter medium, and a radially inner circumferential lip extending in the first direction to seat against an inner circumferential periphery of the center tube. The endcap includes an anti-prefill device disposed at a radially central portion of the endcap, extending from the central, radial disk portion in a second direction opposite to the first direction and designed to prevent the filling of unfiltered fluid into a radially inner side of the annular filter medium. The anti-prefill device includes a first, annular, fluid receiving portion including an externally threaded engagement surface configured to be threadingly engaged with a central, internally threaded boss of a filter base of the filter system at the one axial end of the annular filter medium and including an annular concave recess open upwards in the second direction toward the base of the filter system to which a canister containing the filter element is attached, and a second, annular, fluid blocking portion configured as a cylindrical cap overlapping a radially central tubular portion of the first, annular, fluid receiving portion that projects in the second direction from a radially inner extent of the central, radial disk portion. The second, annular fluid blocking portion is oriented with a concave recess of the cylindrical cap open downwards in the first direction toward the first, annular, fluid receiving portion, the cap having circumferentially spaced legs around the open end of the second, annular, fluid blocking portion and configured to be one of attached to or formed integrally with an annular section of the central, radial disk portion forming a bottom floor of the annular concave recess of the first, annular fluid receiving portion.

In another aspect, the present disclosure is directed to an anti-prefill device disposed at a radially central portion of an endcap and integral with a central, radial disk portion of the endcap mounted and molded to one axial end of an annular filter medium positioned around a center tube of a filter element, the endcap being configured to attach the filter element and filter medium to a filter base of a filter system. The central, radial disk portion of the endcap includes a radially outer circumferential lip extending in a first direction toward the center tube and annular filter medium to overlap and engage with an outer periphery of the annular filter medium, and a radially inner circumferential lip extending in the first direction to seat against an inner circumferential periphery of the center tube. The anti-prefill device includes a first, annular, fluid receiving portion including an externally threaded engagement surface configured to be threadingly engaged with a central, internally threaded boss of the filter base of the filter system at the one axial end of the annular filter medium and including an annular concave recess open upwards toward the filter base of the filter system to which a canister containing the filter element is attached, and a second, annular, fluid blocking portion configured as a cylindrical cap overlapping a radially central tubular portion of the first, annular, fluid receiving portion that projects in the second direction from a radially inner extent of the central, radial disk portion. The second, annular fluid blocking portion is oriented with a concave recess of the cylindrical cap open downwards in the first direction toward the first, annular, fluid receiving portion, the cap having circumferentially spaced legs around the open end of the second, annular, fluid blocking portion and configured to be one of attached to or formed integrally with an annular section of the central, radial disk portion of the endcap forming a bottom floor of the annular concave recess of the first, annular fluid receiving portion.

In yet another aspect, the present disclosure is directed to a filter system. The filter system includes a filter base for connection of the filter system to a vehicle or other machine, the filter base having an inlet port for introduction of unfiltered fluid, an outlet port for discharge of filtered fluid, and a longitudinal axis, a canister connected to the filter base, and a filter element contained within the canister, the filter element including an annular filter medium disposed around a center tube extending along the longitudinal axis in between a top endcap and a bottom endcap. The top endcap includes a central, radial disk portion configured to be mounted and molded to one axial end of the annular filter medium positioned around the center tube of the filter element in the filter system, the central, radial disk portion including a radially outer circumferential lip extending in a first direction toward the center tube and annular filter medium to overlap and engage with an outer periphery of the annular filter medium, and a radially inner circumferential lip extending in the first direction to seat against an inner circumferential periphery of the center tube. The top endcap includes an anti-prefill device disposed at a radially central portion of the top endcap, extending from the central, radial disk portion in a second direction opposite to the first direction and designed to prevent the filling of unfiltered fluid into a radially inner side of the annular filter medium. The anti-prefill device includes a first, annular, fluid receiving portion including an externally threaded engagement surface configured to be threadingly engaged with a central, internally threaded boss of the filter base of the filter system at the one axial end of the annular filter medium and including an annular concave recess open upwards in the second direction toward the base of the filter system to which the canister containing the filter element is attached, and a second, annular, fluid blocking portion configured as a cylindrical cap overlapping a radially central tubular portion of the first, annular, fluid receiving portion that projects in the second direction from a radially inner extent of the central, radial disk portion. The second, annular fluid blocking portion is oriented with a concave recess of the cylindrical cap open downwards in the first direction toward the first, annular, fluid receiving portion, the cap having circumferentially spaced legs around the open end of the second, annular, fluid blocking portion and configured to be one of attached to or formed integrally with an annular section of the central, radial disk portion forming a bottom floor of the annular concave recess of the first, annular fluid receiving portion.

DETAILED DESCRIPTION

Figure 1:
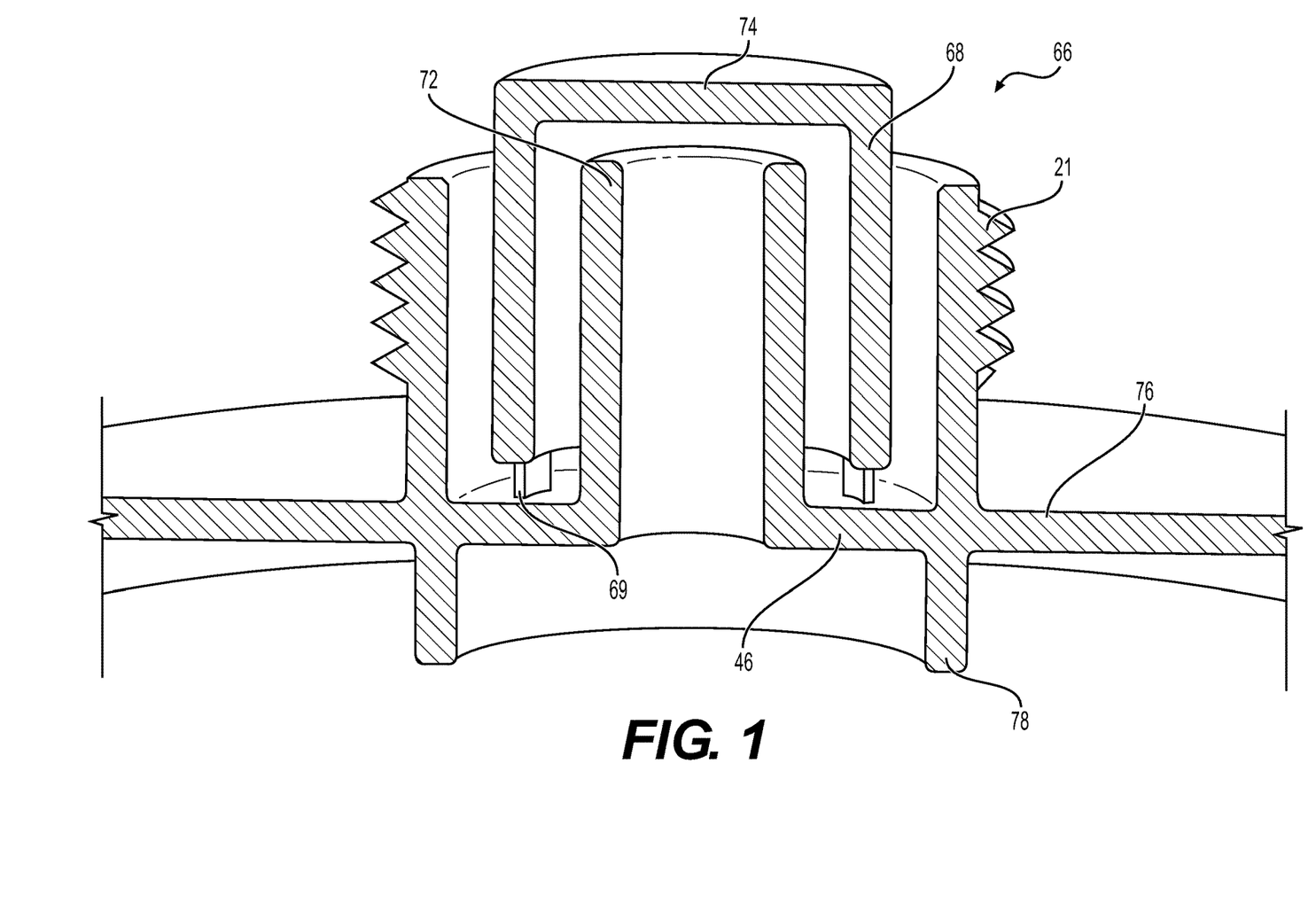
FIG. 1 is a cross-sectional, isometric view of an exemplary anti-prefill device in accordance with the present disclosure.
Figure 2:
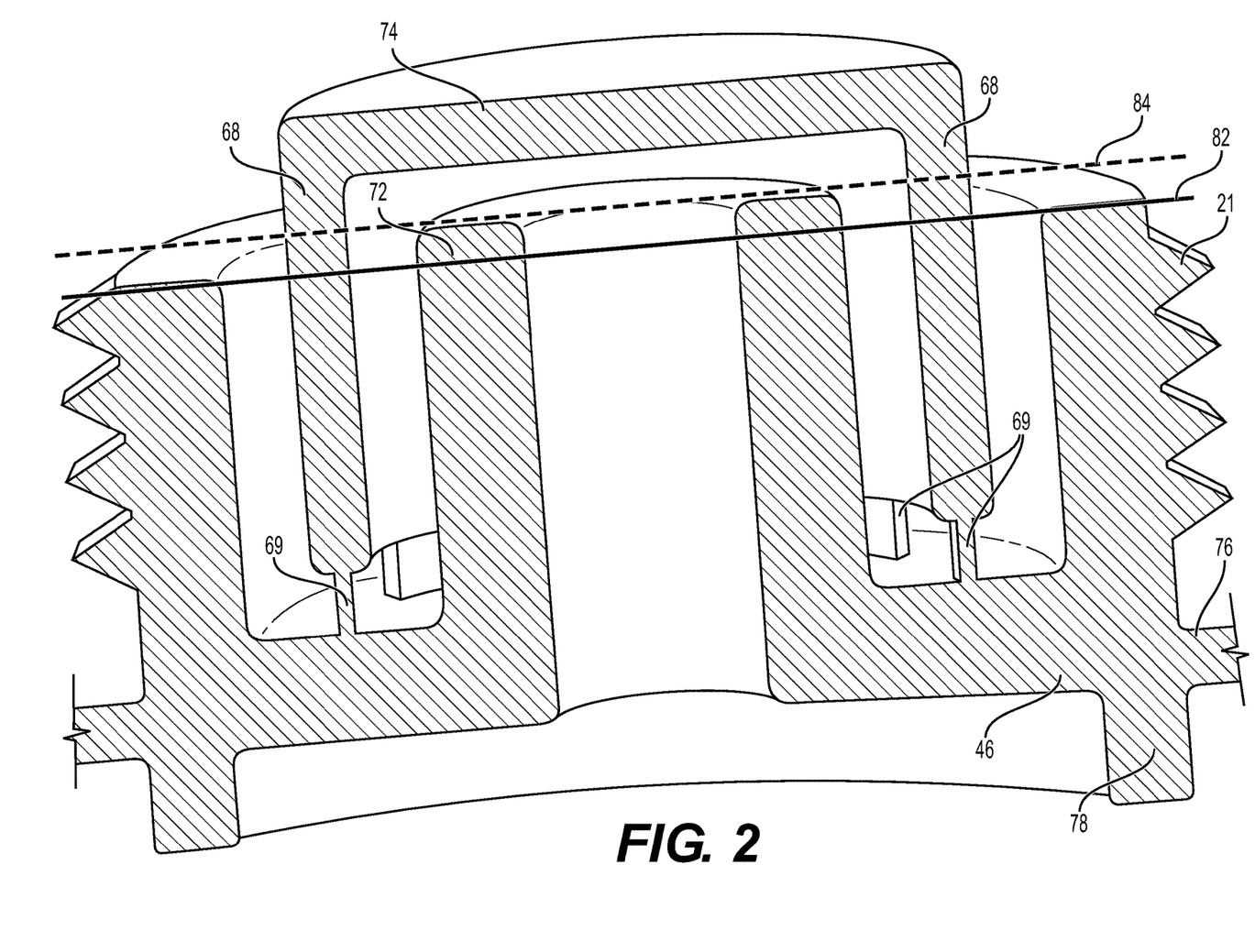
FIG. 2 is a cross-sectional, plan view of the exemplary anti-prefill device of FIG. 1.
Figure 3:
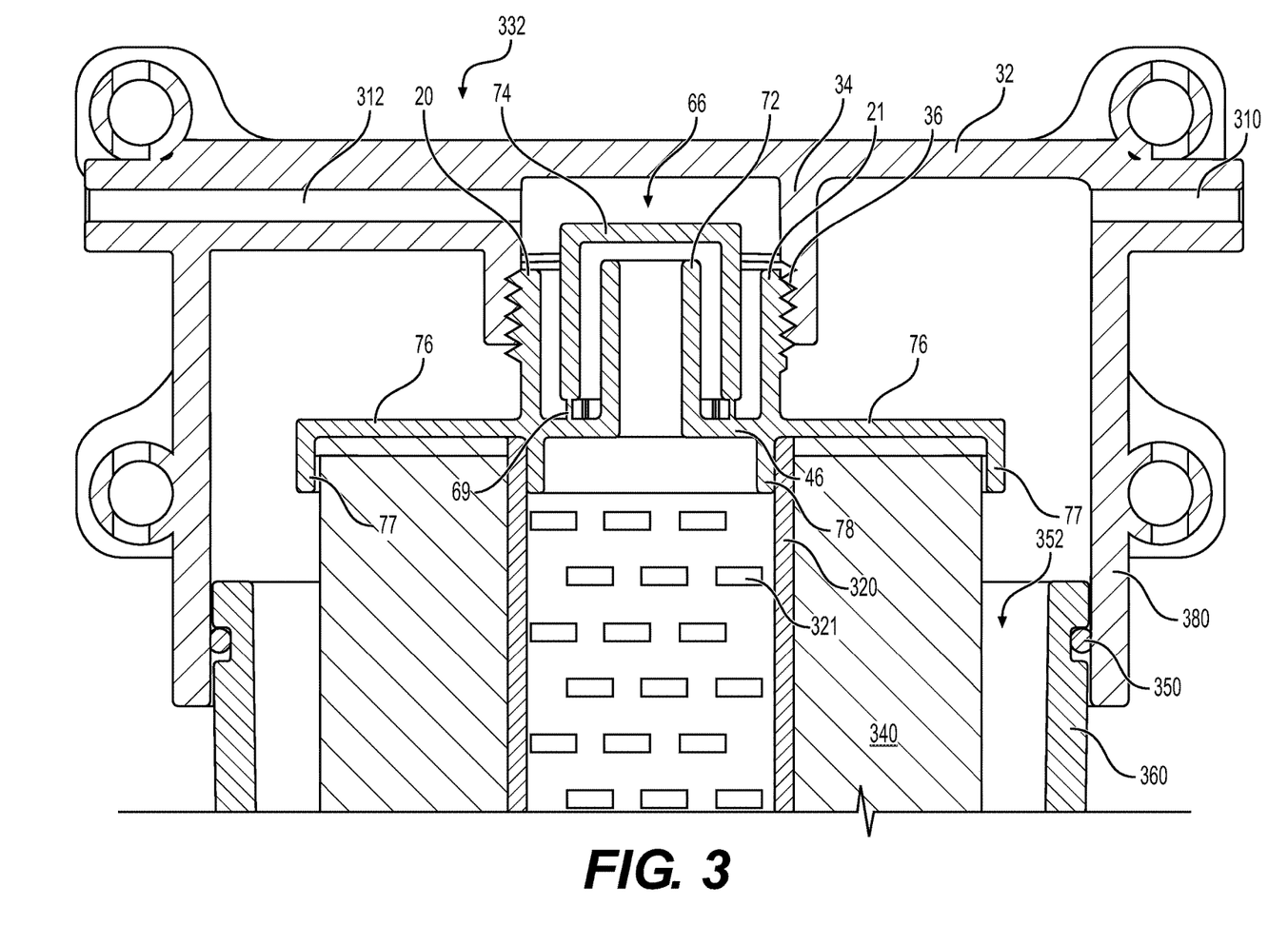
FIG. 3 is a diagrammatic illustration of the exemplary anti-prefill device of FIGS. 1 and 2 integrally formed with a top endcap mated with one axial end of a center tube and surrounding annular filter medium of a filter element.
Figure 4:
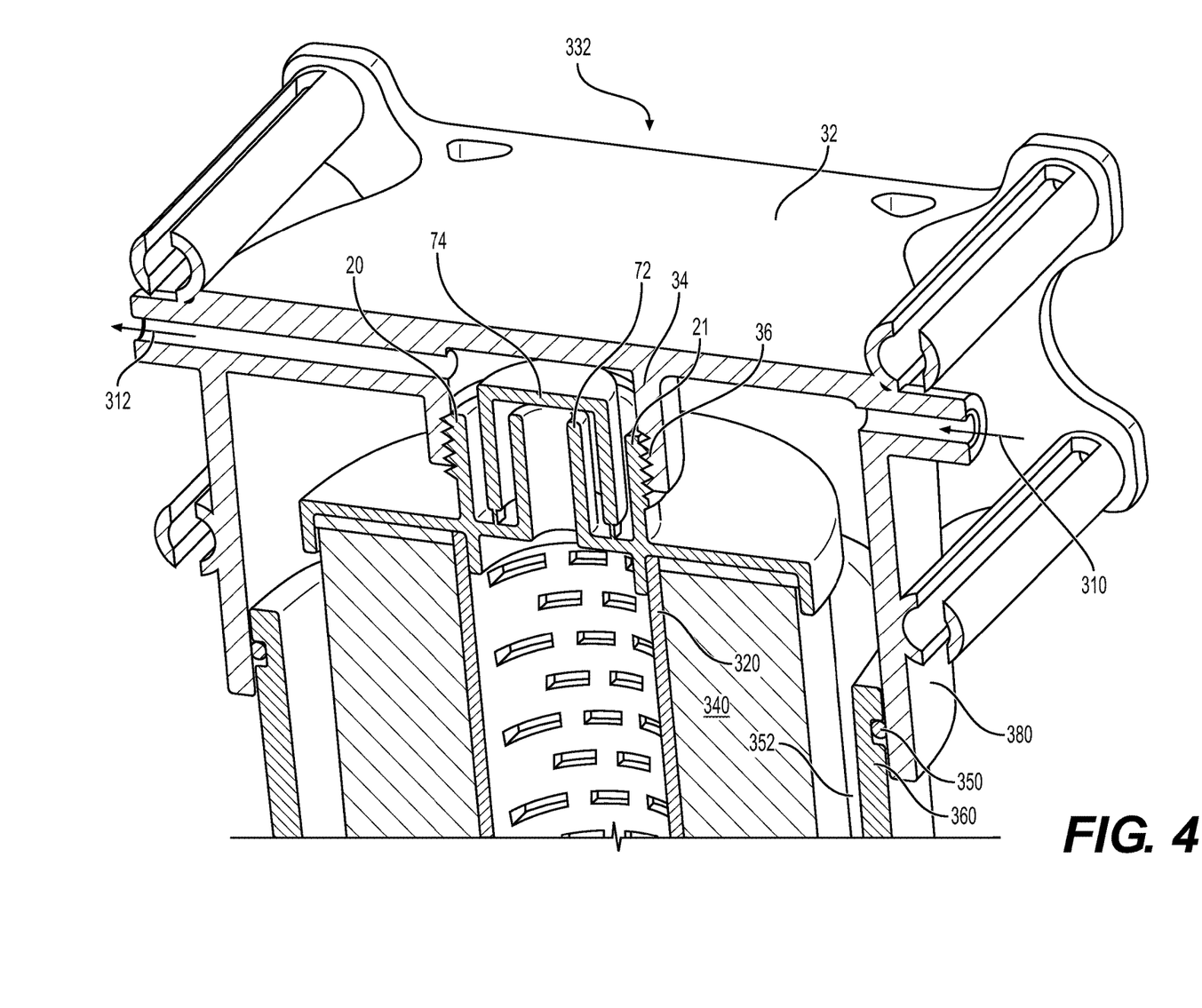
FIG. 4 is a partial cross-sectional, isometric view of a filter element with the exemplary anti-prefill device of FIGS. 1 and 2 mounted in a canister connected with a filter base of a filter system.
Figure 5:
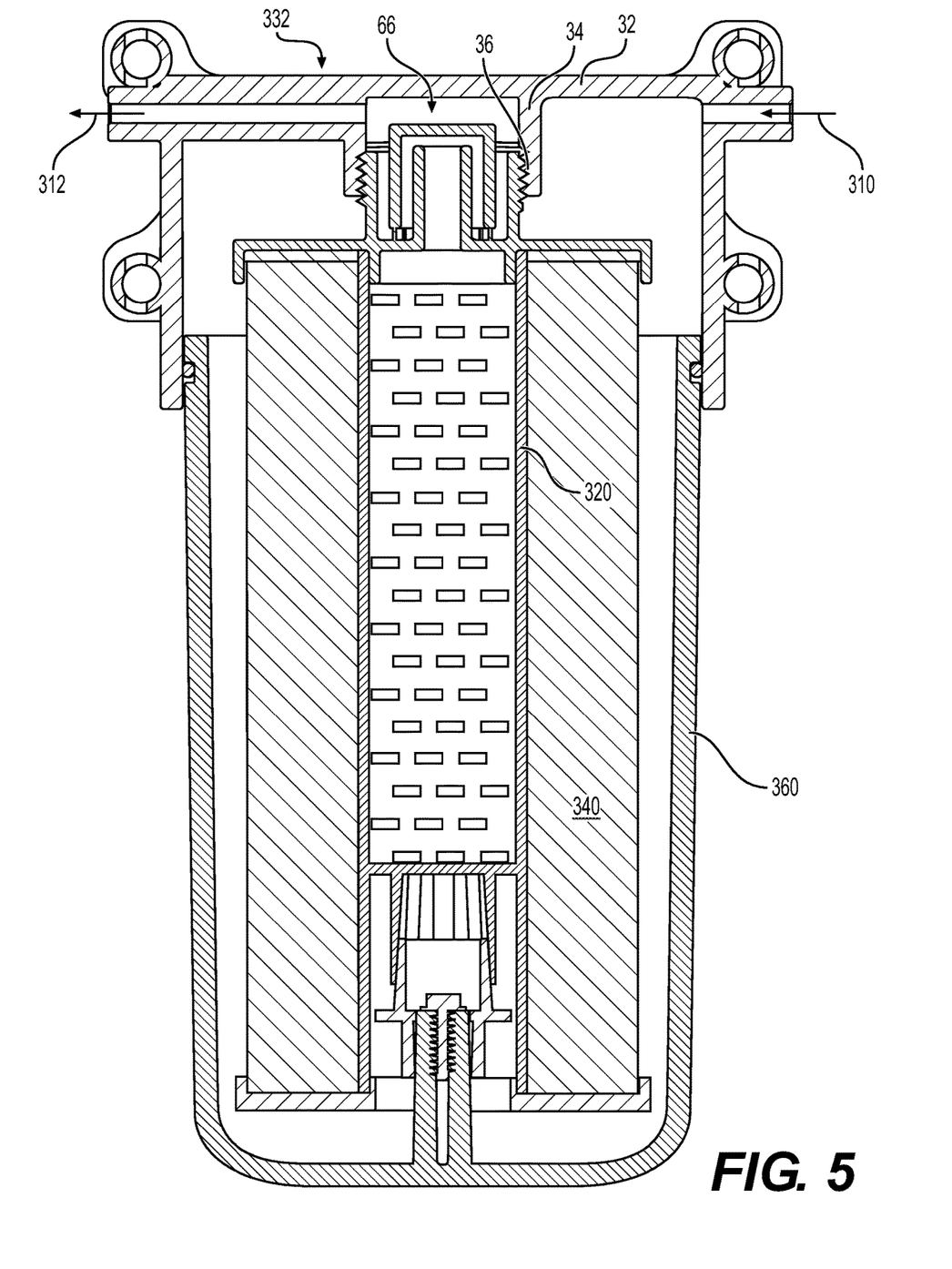
FIG. 5 is a cross-sectional, side elevation view of the exemplary filter system partially shown in FIG. 4.
Figure 6:
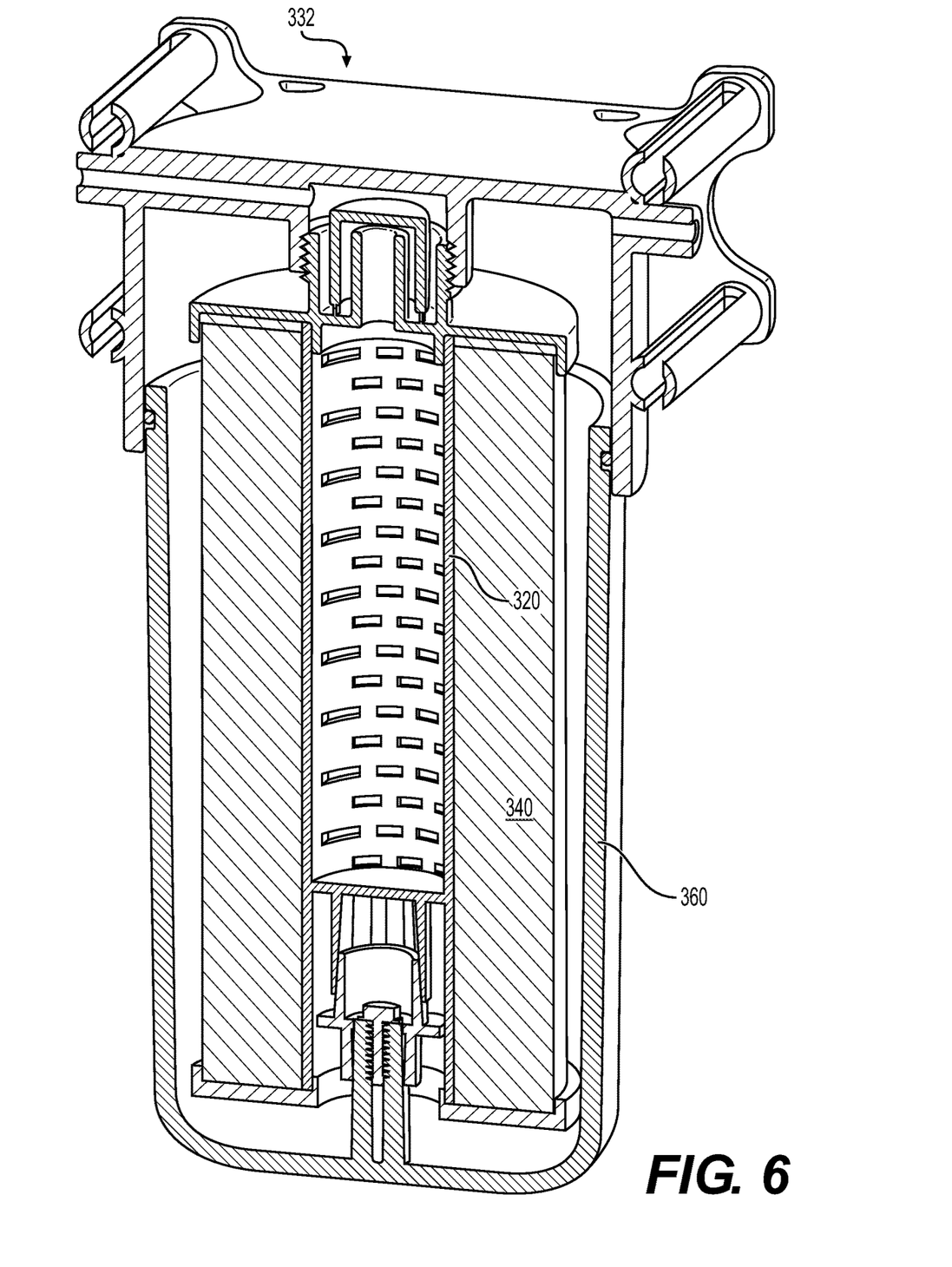
FIG. 6 is a cross-sectional, isometric view of the exemplary filter system shown in FIG. 5.
Figure 7:
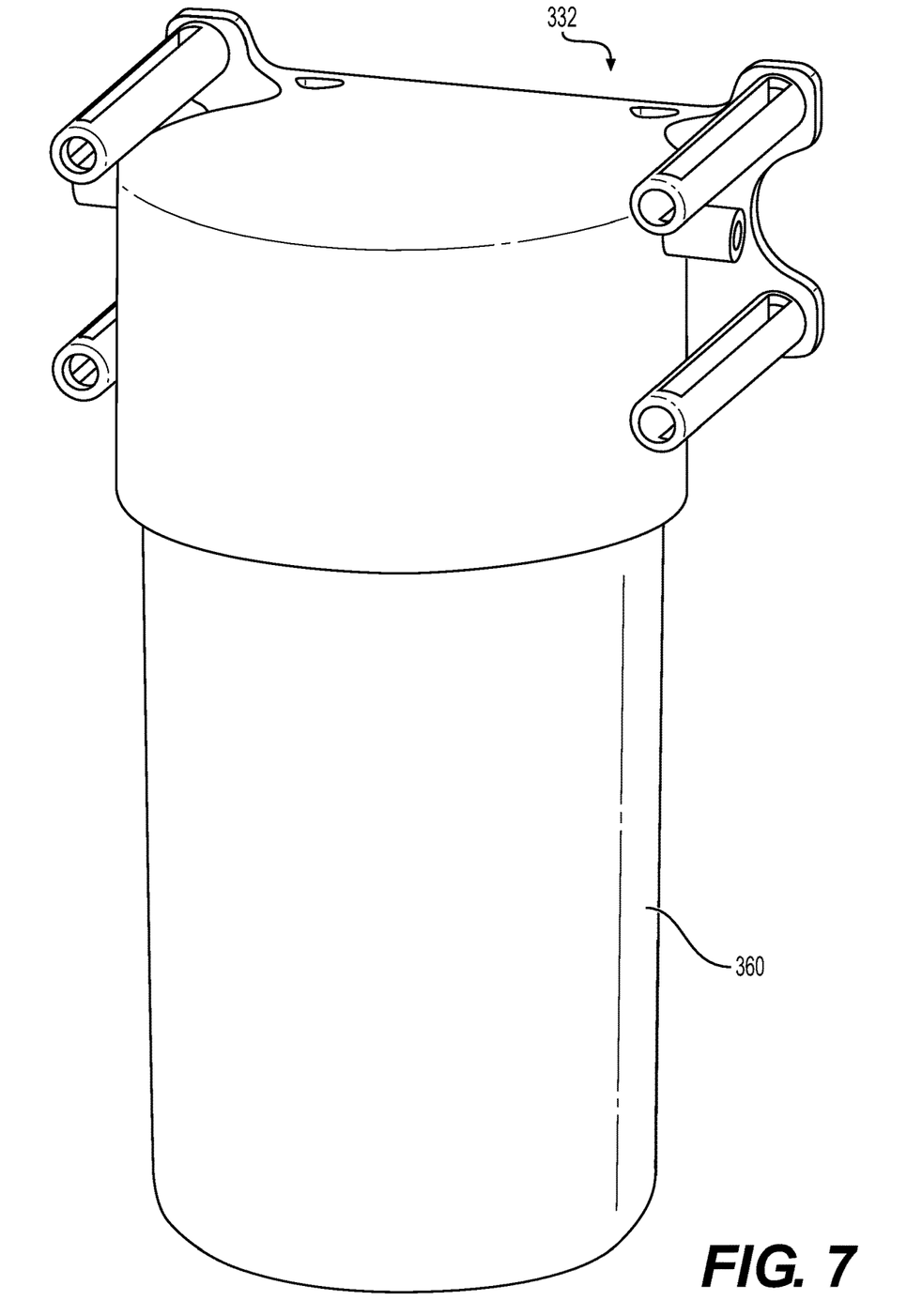
FIG. 7 is an isometric view of the canister connected to the filter base in the filter system shown in FIGS. 5 and 6.

FIGS. 1 and 2 illustrate an exemplary anti-prefill device 66 according to an embodiment of this disclosure, and FIG. 3 is a diagrammatic illustration of anti-prefill device 66 formed integrally with a top endcap 76 mounted and molded to one axial end of an annular filter medium 340. A filter element includes annular filter medium 340 positioned around a center tube 320 and sandwiched in between top endcap 76 and a bottom endcap (shown at the bottom of annular filter medium 340 in FIGS. 5 and 6). The filter element may be contained within a canister 360 and physically attached to a filter base 332 by threaded engagement between a threaded section 20, 21 of top endcap 76 and an internally threaded boss 34, 36 of filter base 332 configured to connect the filter element to a filter system on a vehicle or other machine.

In various exemplary embodiments of this disclosure, top endcap 76 may be formed by injecting a resin material into a mold configured to include the features of top endcap 76, and oriented with top endcap 76 upside down from the orientation shown in the figures, with a top end of annular filter medium 340 positioned around center tube 320 and supported between a radially outer circumferential lip 77 and a radially inner circumferential lip 78 of top endcap 76 in an inverted position during the molding operation. As the resin material is injected into the mold to form top endcap 76, the material may integrate with and bond to fibers of annular filter medium 340 at a top portion of annular filter medium 340.

As shown in FIGS. 3-7, the filter system according to exemplary embodiments of this disclosure may include filter base 332 with a top plate 32 and additional features for connection of the filter system to a vehicle or other machine. Filter base 332 may include an inlet port 310 through top plate 32 for introduction of unfiltered fluid, and an outlet port 312 through top plate 32 for discharge of filtered fluid. The filter system may also include a canister 360 connected to filter base 332, and the filter element may be replaceably contained within canister 360, which may be removably engaged in a sealed manner with filter base 332. The filter element includes annular filter medium 340 disposed around center tube 320 extending along the longitudinal axis in between top endcap 76 and a bottom endcap configured to engage with a drain port at a bottom end of canister 360. Top endcap 76 may include a central, radial disk portion configured to be mounted and molded to a top axial end of annular filter medium 340 positioned around center tube 320 of the filter element in the filter system. The central, radial disk portion of top endcap 76 may include radially outer circumferential lip 77 extending in a first direction toward center tube 320 and annular filter medium 340 to overlap and engage with an outer periphery of annular filter medium 340, and radially inner circumferential lip 78 extending in the first direction to seat against an inner circumferential periphery of center tube 320.

Top endcap 76 includes anti-prefill device 66 disposed at a radially central portion of top endcap 76, extending from the central, radial disk portion in a second direction opposite to the first direction and designed to prevent the filling of unfiltered fluid into a radially inner side of annular filter medium 340. Anti-prefill device 66 may include a first, annular, fluid receiving portion including an externally threaded engagement surface 20, 21 configured to be threadingly engaged with a central, internally threaded boss 34, 36 of filter base 332 of the filter system at the one axial end of annular filter medium 340, as shown in FIGS. 3-6. The first, annular, fluid receiving portion of anti-prefill device 66 may include an annular concave recess open upwards in the second direction toward base 332 of the filter system to which canister 360 containing the filter element is attached when the filter system is assembled and installed on a vehicle or other machine. A second, annular, fluid blocking portion of anti-prefill device 66 may be configured as a cylindrical cap 74, 68, 69 overlapping a radially central tubular portion 72 of the first, annular, fluid receiving portion that projects in the second direction from a radially inner extent of the central, radial disk portion of top endcap 76. The second, annular fluid blocking portion is oriented with a concave recess of the cylindrical cap 74 open downwards in the first direction toward the first, annular, fluid receiving portion. Cylindrical cap 74 may be configured with circumferentially spaced legs 69 of a cylindrical body 68 around an open end of the second, annular, fluid blocking portion, with the circumferentially spaced legs 69 either attached to or formed integrally with an annular section 46 of the central, radial disk portion forming a bottom floor of the annular concave recess of the first, annular fluid receiving portion.

Annular filter medium 340 may be positioned around center tube 320, as shown in FIGS. 3-6. Center tube 320 may be perforated with multiple radial openings 321 to allow fluid that has passed radially inwardly through annular filter medium 340 to pass to outlet port 312 of the filter system. Anti-prefill device 66 may form a part of top endcap 76, and may be integrally molded with top endcap 76 at the same time as top endcap 76 is molded to a top end of annular filter medium 340 positioned around center tube 320, as discussed above. Anti-prefill device 66 may be disposed at a radially central portion of top endcap 76. As discussed above, anti-prefill device 66 may be designed to prevent the filling of unfiltered fluid into a radially inner side of the annular filter medium.

The openings between circumferentially spaced legs 69 of cylindrical cap 74, 68, 69 allow for the passage of fluid from a radially inner region between radially central tubular projection 72 of the first, annular, fluid receiving portion and the cylindrical cap 68 and a radially outer region between cylindrical body 68 of the cylindrical cap and radially outer cylindrical wall 20 of the first, annular, fluid receiving portion. As shown in FIGS. 1-6, radially outer cylindrical wall 20 of the first, annular, fluid receiving portion of anti-prefill device 66 may include an external threaded portion 21 configured to be threadingly engaged with internal threads 36 of radially central boss 34 extending downward from plate 32 of filter base 332 when the filter element is assembled to filter base 332 in a vehicle or other machine.

As shown in FIGS. 2 and 3, radially central tubular projection 72 of the first, annular, fluid receiving portion of anti-prefill device 66 extends axially along a central longitudinal axis of the anti-prefill device toward filter base 332 of the filter system, with a top end face 84 of radially central tubular projection 72 being spaced a predetermined distance from an underside of cylindrical cap 74 of the second, annular, fluid blocking portion of anti-prefill device 66. Radially outer cylindrical wall 20 of anti-prefill device 66 with external threaded portion 21 extends axially along the central longitudinal axis of anti-prefill device 66 toward filter base 332 of the filter system. A top end face 82 of radially outer cylindrical wall 20 may be configured to be lower relative to annular section 46 of the central, radial disk portion forming a bottom floor of the annular concave recess of the first, annular fluid receiving portion than top end face 84 of radially central tubular projection 72. As a result of the above-described configuration, shown in FIG. 2, if an attempt is made before the filter element with anti-prefill device 66 is threadingly engaged with filter base 332 to pour fluid into the annular concave recess of the first, annular fluid receiving portion in order to "prime" the filter system, fluid introduced into the annular concave recess of the first, annular fluid receiving portion of anti-prefill device 66 flows radially outward over top end face 82 of outer cylindrical wall 20 before the fluid can rise to a level high enough to flow radially inward over the higher top end face 84 of radially central tubular projection 72. Anti-prefill device 66 thereby prevents fluid that may be introduced into the annular concave recess of the first annular fluid receiving portion of anti-prefill device 66, such as when an operator may attempt to prime fluid into the filter system after replacement of the filter element with annular filter medium 340, from flowing radially inward into radially central tubular projection 72. Anti-prefill device 66 thus prevents any accidental introduction of an unfiltered fluid into the radially inner side of annular filter medium 340, from which filtered fluid is exiting, and directs the unfiltered fluid radially outward over the top endcap and down into the annular space 352 around the outer peripheral side of annular filter medium 340 between the filter medium and canister 360 that supports the filter element. The unfiltered fluid may then pass radially inward through annular filter medium 340 and through radial openings 321 in center tube 320 of the filter element, to then pass axially along center tube 320 and through the central passageway in radially central tubular projection 72 before passing to the outlet 312 in filter base 332 of the fluid filter system.

In various exemplary embodiments of anti-prefill device 66, such as shown in FIGS. 1-6, circumferentially spaced legs 69 around the open end of the second, annular, fluid blocking portion may be ultrasonically welded to the bottom floor of the annular concave recess of the first, annular fluid receiving portion. In other alternative embodiments, anti-prefill device 66 may be manufactured using 3D manufacturing techniques, or other additive manufacturing techniques. Anti-prefill device 66 itself may be integrally molded at a radially central portion of the central, radial disk portion of top endcap 76 at the same time as top endcap 76 is molded to a top axial end of annular filter medium 340.

Anti-prefill device 66 forms an integral part of a fluid filter system, which may include filter base 332 configured for connecting the filter system to a vehicle or other machine, canister 360 configured to be engaged with an annular portion 380 of filter base 332 in a sealed manner, and a filter element contained within canister 360. The filter system may be configured to receive unfiltered fluid from one or more upstream components of a fluid system, such as a hydraulic system, a lubricating system, a cooling system, or a fuel system for heavy machinery, trap particles suspended within the unfiltered fluid, i.e., filter the fluid, and provide filtered fluid to one or more downstream components of the fluid system. The fluid system may include any type of fluid system, e.g., a hydraulic system, a fuel delivery system, a lubricating system, and/or a coolant system, and may or may not be operatively associated with an engine. Additionally, the fluid filter system may be configured to filter any type of fluid, such as, for example, gasoline, diesel fuel, hydraulic fluid, lubricating oil, water, coolant, and/or any other type of fluid. It is contemplated that the fluid of the fluid system may or may not be pressurized and, if so, may be at any pressure.

In some exemplary embodiments, filter base 332 for connecting the filter system may include an outer wall and a mounting portion. The outer wall of the base may be substantially cylindrical in shape and may be configured to receive canister 360 containing the filter element with annular filter medium 340 sandwiched between a bottom endcap and top endcap 76. The mounting portion of the filter base may be configured to connect the fluid filter system to, for example, an engine, via one or more bolt holes. The base may further define inlet port 310 configured for receiving an unfiltered fluid and outlet port 312 configured for discharging the filtered fluid after the unfiltered fluid has passed radially through annular filter medium 340. Inlet port 310 of filter base 332 may be configured to receive unfiltered fluid from one or more upstream components of a fluid system and may be configured to direct the unfiltered fluid toward annular filter medium 340. Specifically, inlet port 310 of filter base 332 may include a generally annular space within the base and with respect to a longitudinal axis of the filter element. Outlet port 312 may be configured to receive filtered fluid from a radially inner side of annular filter medium 340 after the filtered fluid has passed through the radially central tubular projection 72 of anti-prefill device 66 and then passed from a radially inner region between radially central tubular projection 72 of the first, annular, fluid receiving portion and the cylindrical cap 68 and a radially outer region between the cylindrical cap 68 and radially outer cylindrical wall 20 of the first, annular, fluid receiving portion. Outlet port 312 of filter base 332 of the filter system may be configured to direct the filtered fluid toward one or more downstream components of the fluid system.

Canister 360 of the filter system may include an outer wall and an endwall, and the outer wall may be substantially cylindrical in shape and may be configured to form a sealed interface with an internal periphery of filter base 332, for example, including an O-ring seal 350, or other interconnection, as shown in FIGS. 3-6. The outer wall and endwall of canister 360 may generally define an internal cavity configured to contain the filter assembly. Canister 360 may include any conventional drain port that may be configured to facilitate draining of fluid from the canister and/or may include any conventional relief valve to limit a pressure of the fluid of the fluid system.

Annular filter medium 340 may be supported at opposite axial ends by top endcap 76 and a bottom endcap configured to engage a bottom end of annular filter medium 340 and center tube 320. As discussed above, top endcap 76 may be formed integrally with anti-prefill device 66, disposed adjacent filter base 332 of the filter assembly when assembled, and configured to connect annular filter medium 340 and center tube 320 to filter base 332, for example, by threaded engagement surface 20, 21 of the first annular fluid receiving portion of anti-prefill device 66. Annular filter medium 340 may be configured to trap particulates and/or other particles suspended within a fluid and may include a generally cylindrical shape disposed about center tube 320 and extending along a longitudinal axis. It is also contemplated that annular filter medium 340 may include any filter material and/or medium known in the art, such as, for example, fabric or other porous material, and may or may not be pleated. The endcaps at opposite axial ends of annular filter medium 340 may be made from any suitable material, such as, for example, a polymer or other plastic, or resin material, and may be injection molded in conjunction with annular filter medium 340 such that the resin material of one or both endcaps bonds to end fibers of annular filter medium 340 to form an integral filter element.

INDUSTRIAL APPLICABILITY

The disclosed anti-prefill device for a fluid filter system may be applicable to any filter system for any type of fluid and may provide an effective and simple means of combining the functionality of a top endcap for an annular filter medium, while incorporating structure integral with the endcap that prevents the accidental introduction of unfiltered fluid into the inner, filtered side of the annular filter medium. An operator may attempt to introduce unfiltered fluid into the annular filter medium under different circumstances, without being aware of the potential problems this may cause, such as when the operator may attempt to prime a filter assembly after replacement of the annular filter medium in order to remove any air that may become trapped in the filter system.

Referring to FIG. 2, the greater height from the bottom floor of the annular concave recess of the first, annular fluid receiving portion of anti-prefill device 66 to the top end face 84 of radially central tubular projection 72, relative to the height from the bottom floor to the top end face 82 of the outer cylindrical wall 20, ensures that any liquid introduced into the annular concave recess flows radially outward over top end face 82 of outer cylindrical wall 20 before the fluid can rise to a level high enough to flow radially inward over the higher top end face 84 of radially central tubular projection 72. Anti-prefill device 66 thereby prevents fluid that may be introduced into the annular concave recess of the first annular fluid receiving portion of anti-prefill device 66, such as when an operator may attempt to prime fluid into the filter system during replacement of a filter element including annular filter medium 34, from flowing radially inward into radially central tubular projection 72. Anti-prefill device 66 thus prevents any accidental introduction of an unfiltered fluid into the radially inner side of annular filter medium 340, from which filtered fluid is exiting, and directs the unfiltered fluid radially outward over the top endcap and down around the outer peripheral side of annular filter medium 340 between the filter medium and the canister that supports the filter element. The unfiltered fluid may then pass radially inward through annular filter medium 340 and through the perforations in the center tube of the filter element, to then pass as clean, filtered fluid axially along the center tube and through the central passageway in radially central tubular projection 72 before passing to the outlet in the base of the fluid filter system.

It may be desirable to replace the filter element including annular filter medium 340 since it may be saturated with trapped particles, seals of the filter assembly may be deteriorated, and/or a maintenance period may have elapsed. An operator may remove canister 360 from its sealed engagement with filter base 332 in order to then unthread the filter element including top endcap 76 and a bottom endcap with annular filter medium 340 sandwiched in between the endcaps. The entire filter element with new endcaps, anti-prefill device, and clean filter medium 340 may then be replaced.

If an operator attempts to prime the new filter element with fluid to remove any air pockets before rethreading top endcap 76 of a new filter element into filter base 332 by, for example, pouring fluid on the top surface of the top endcap, e.g., the surface of the endcap facing and/or exposed to the inlet port of the filter base, the fluid will flow radially outwardly over the top surface 82 of the threaded engagement surface 20, 21 of anti-prefill device 66 without passing radially inwardly over the higher top surface 84 of the radially central tubular projection 72 and into the clean, filtered side of annular filter medium 340. The priming fluid may or may not be filtered and, as discussed above, anti-prefill device 66 may reduce and/or prevent the fluid from entering the interior space of annular filter medium 34.

It will be apparent to those skilled in the art that various modifications and variations can be made to the disclosed fluid filter system. Other embodiments will be apparent to those skilled in the art from consideration of the specification and practice of the disclosed method and apparatus. It is intended that the specification and examples be considered as exemplary only, with a true scope being indicated by the following claims and their equivalents.

What is claimed is:

1. An endcap, comprising:
    a central, radial disk portion configured to be mounted and molded to an axial end of an annular filter medium positioned around a center tube of a filter element in a filter system, the central, radial disk portion including:
        a radially outer circumferential lip extending in a first direction toward the center tube and annular filter medium and configured to overlap and engage with an outer circumferential periphery of the annular filter medium, and
        a radially inner circumferential lip extending in the first direction and configured to seat against an inner circumferential periphery of the center tube; and
    an anti-prefill device disposed at a radially central portion of the endcap, extending from the central, radial disk portion in a second direction opposite to the first direction and designed to prevent the filling of unfiltered fluid into a radially inner side of the annular filter medium, the anti-prefill device including:
        a first, annular, fluid receiving portion including an externally threaded engagement surface configured to be threadingly engaged with a central, internally threaded boss of a filter base of the filter system at the axial end of the annular filter medium,
        an annular concave recess defined by the first, annular, fluid receiving portion and open upwards in the second direction toward the filter base of the filter system, the filter base being configured to engage with a canister adapted to contain the filter element, and
        a second, annular, fluid blocking portion configured as a cylindrical cap overlapping a radially central tubular portion of the first, annular, fluid receiving portion that projects in the second direction from a radially inner extent of the central, radial disk portion, the second, annular fluid blocking portion being oriented with a concave recess of the cylindrical cap open downwards in the first direction toward the first, annular, fluid receiving portion.

2. The endcap of claim 1, wherein the cylindrical cap of the second, annular, fluid blocking portion comprises a plurality of circumferentially spaced legs disposed around the open end of the second, annular, fluid blocking portion and configured to be one of attached to or formed integrally with an annular section of the central, radial disk portion.

3. The endcap of claim 2, wherein openings between the circumferentially spaced legs allow for the passage of fluid from a radially inner region between the radially central tubular portion of the first, annular, fluid receiving portion and the cylindrical cap and a radially outer region between the cylindrical cap and a radially outer cylindrical wall of the first, annular, fluid receiving portion.

4. The endcap of claim 2, wherein the annular section of the central, radial disk portion forms a bottom floor of the annular concave recess defined by the first, annular, fluid receiving portion, the annular section comprising:
    a radially inner portion contiguous with the radially central tubular portion of the first, annular, fluid receiving portion, and
    a radially outer portion contiguous with a radially outer cylindrical wall of the anti-prefill device, the radially outer cylindrical wall of the anti-prefill device including the externally threaded engagement surface configured to be threadingly engaged with the central, internally threaded boss of the filter base of the filter system.

5. The endcap of claim 4, wherein the radially central tubular portion of the first, annular, fluid receiving portion extends axially along a central longitudinal axis of the anti-prefill device toward the filter base of the filter system, with a top end face of the radially central tubular portion being spaced a predetermined distance from an underside of the cylindrical cap of the second, annular, fluid blocking portion.

6. The endcap of claim 5, wherein the radially outer cylindrical wall of the anti-prefill device extends axially along the central longitudinal axis of the anti-prefill device toward the filter base of the filter system, with a top end face of the radially outer cylindrical wall being lower relative to the bottom floor of the annular concave recess of the first, annular fluid receiving portion than the top end face of the radially central tubular portion.

7. The endcap of claim 6, wherein fluid introduced into the annular concave recess of the first, annular fluid receiving portion flows radially outward over the top end face of the outer cylindrical wall and over the endcap to a radially outer side of the annular filter medium.

8. The endcap of claim 2, wherein the circumferentially spaced legs around the open end of the second, annular, fluid blocking portion are ultrasonically welded to a bottom floor of the annular concave recess of the first, annular fluid receiving portion.

9. The endcap of claim 1 wherein the anti-prefill device is integrally molded at a radially central portion of the central, radial disk portion, and a surface of a radially outer annular portion of the central, radial disk portion facing in the first direction is configured to be molded to the axial end of the annular filter medium.

10. An anti-prefill device configured to be disposed at a radially central portion of an endcap adapted to be molded to an axial end of an annular filter medium positioned around a center tube of a filter element, the anti-prefill device comprising:
- a first, annular, fluid receiving portion including an externally threaded engagement surface configured to be threadingly engaged with a central, internally threaded boss of a filter base of a filter system at the axial end of the annular filter medium, the first, annular, fluid receiving portion defining an annular concave recess open upwards toward the filter base of the filter system; and
- a second, annular, fluid blocking portion configured as a cylindrical cap overlapping a radially central tubular portion of the first, annular, fluid receiving portion that projects upwards toward the filter base from a radially inner extent of the radially central portion of the endcap, the second, annular fluid blocking portion being oriented with a concave recess of the cylindrical cap open downwards toward the first, annular, fluid receiving portion.

11. The anti-prefill device of claim 10, wherein the cylindrical cap of the second, annular, fluid blocking portion comprises a plurality of circumferentially spaced legs disposed around the open end of the second, annular, fluid blocking portion and configured to be one of attached to or formed integrally with an annular section of the radially central portion of the endcap.

12. The anti-prefill device of claim 11, wherein openings between the circumferentially spaced legs allow for the passage of fluid from a radially inner region between the radially central tubular portion of the first, annular, fluid receiving portion and the cylindrical cap and a radially outer region between the cylindrical cap and a radially outer cylindrical wall of the first, annular, fluid receiving portion.

13. The anti-prefill device of claim 11, wherein the annular section of the radially central portion of the endcap forms a bottom floor of the annular concave recess defined by the first, annular, fluid receiving portion, the annular section comprising:
- a radially inner portion contiguous with the radially central tubular portion of the first, annular, fluid receiving portion, and
- a radially outer portion contiguous with a radially outer cylindrical wall of the anti-prefill device, the radially outer cylindrical wall of the anti-prefill device including the externally threaded engagement surface configured to be threadingly engaged with the central, internally threaded boss of the filter base of the filter system.

14. The anti-prefill device of claim 13, wherein the radially central tubular portion of the first, annular, fluid receiving portion extends axially along a central longitudinal axis of the anti-prefill device toward the filter base of the filter system, with a top end face of the radially central tubular portion being spaced a predetermined distance from an underside of the cylindrical cap of the second, annular, fluid blocking portion.

15. The anti-prefill device of claim 14, wherein the radially outer cylindrical wall of the anti-prefill device extends axially along the central longitudinal axis of the anti-prefill device toward the filter base of the filter system, with a top end face of the radially outer cylindrical wall being lower relative to the bottom floor of the annular concave recess of the first, annular fluid receiving portion than the top end face of the radially central tubular portion.

16. The anti-prefill device of claim 15, wherein fluid introduced into the annular concave recess of the first, annular fluid receiving portion flows radially outward over the top end face of the radially outer cylindrical wall and over the endcap to a radially outer side of the annular filter medium.

17. The anti-prefill device of claim 11, wherein the circumferentially spaced legs around the open end of the second, annular, fluid blocking portion are ultrasonically welded to a bottom floor of the annular concave recess of the first, annular fluid receiving portion.

18. The anti-prefill device of claim 10 wherein the anti-prefill device is integrally molded at the radially central portion of the endcap, and a lower surface of a radially outer annular portion of the endcap is configured to be molded to the axial end of the annular filter medium.

19. A filter system, comprising:
- a filter base configured for connection of the filter system to a vehicle or other machine, the filter base including an inlet port for introduction of unfiltered fluid, and an outlet port for discharge of filtered fluid;
- a canister connected to the filter base; and
- a filter element contained within the canister, the filter element including:
  - a center tube,
  - a top endcap,
  - a bottom endcap, and
  - an annular filter medium extending along a central longitudinal axis of the filter base and the canister in between the top endcap and the bottom endcap,
  wherein the top endcap includes:
  - a central, radial disk portion configured to be mounted and molded to one axial end of the annular filter medium positioned around the center tube of the filter element, the central, radial disk portion including a radially outer circumferential lip extending in a first direction toward the center tube and annular filter medium to overlap and engage with an outer periphery of the annular filter medium, and a radially inner circumferential lip extending in the first direction to seat against an inner circumferential periphery of the center tube, and
  - an anti-prefill device disposed at a radially central portion of the top endcap, extending from the central, radial disk portion in a second direction opposite to the first direction and designed to prevent the filling of unfiltered fluid into a radially inner side of the annular filter medium, wherein the anti-prefill device includes:
    - a first, annular, fluid receiving portion including an externally threaded engagement surface configured to be threadingly engaged with a central, internally threaded boss of the filter base at the one axial end of the annular filter medium, the first annular, fluid receiving portion defining an annular concave recess open upwards in the second direction toward the filter base to which the canister containing the filter element is attached, and
    - a second, annular, fluid blocking portion configured as a cylindrical cap overlapping a radially central tubular portion of the first, annular, fluid receiving portion that projects in the second direction from a radially inner extent of the central, radial disk portion, the second, annular fluid blocking portion being oriented with a concave recess of the cylindrical cap open downwards in the first direction toward the first, annular, fluid receiving portion.

20. The filter system of claim 19, wherein:

the first, annular, fluid receiving portion of the anti-prefill device comprises a bottom, ring-shaped plate member forming a bottom floor of the annular concave recess of the first, annular fluid receiving portion and including a radially inner portion contiguous with the radially central tubular portion of the first, annular, fluid receiving portion, and a radially outer portion contiguous with a radially outer cylindrical wall of the anti-prefill device, the outer cylindrical wall including the externally threaded engagement surface configured for the threaded engagement of the anti-prefill device with the central, internally threaded boss of the filter base at the one axial end of the annular filter medium; and the cylindrical cap comprises circumferentially spaced legs around the open end of the second, annular, fluid blocking portion, the legs being configured to be one of attached to or formed integrally with the bottom floor of the annular concave recess of the first, annular fluid receiving portion.

* * * * *